United States Patent [19]

Falkenburg et al.

[11] 4,379,909
[45] Apr. 12, 1983

[54] COATING COMPOSITIONS

[75] Inventors: Hans R. Falkenburg, Haan; Siegfried Krause, Mettmann; Robert C. McGuiness, Erkrath, all of Fed. Rep. of Germany

[73] Assignees: Hermann Wiederhold GmbH Corp., Hilden, Fed. Rep. of Germany; Imperial Chemical Industries PLC, London, England

[21] Appl. No.: 315,266

[22] Filed: Oct. 26, 1981

[30] Foreign Application Priority Data

Oct. 27, 1980 [GB] United Kingdom ............... 8034533

[51] Int. Cl.³ .................... C08G 59/68; C08G 59/42
[52] U.S. Cl. ................................. 528/94; 525/514; 528/112; 528/113; 528/341; 528/361; 528/365
[58] Field of Search ............... 525/514; 528/94, 112, 528/113, 341, 361, 365

[56] References Cited

U.S. PATENT DOCUMENTS 3,844,998 10/1974 Jeffery et al. .................. 525/510 X
4,180,488 12/1979 Stern et al. .................... 525/510 X
4,289,826 9/1981 Howell .......................... 525/510 X

*Primary Examiner*—Earl A. Nielsen
*Attorney, Agent, or Firm*—Cushman, Darby & Cushman

[57] ABSTRACT

Coating lacquers, particularly useful for coating cans, comprise an epoxide resin, a polycarboxylic acid anhydride curing agent, an organic solvent and an accelerator derived from melamine, benzoguanamine or glycoluril. Particularly useful accelerators are the formaldehyde condensates of these materials and their ethers. The coatings are non-toxic and are cured at temperatures lower than conventional.

6 Claims, No Drawings

COATING COMPOSITIONS

This invention relates to coating lacquers suitable for use on a metal substrate, particularly to coating lacquers comprising an epoxide resin, a selected curing agent and an accelerator.

It is well known that epoxide resins (i.e. substances containing on average more than one 1,2-epoxide group per molecule) when used in conjunction with suitable curing agents form potentially useful products such as coatings. Examples of suitable curing agents are polyhydric phenols and cresols, and urea- and melamine-based materials. In order to achieve desirable properties in the products it is necessary to apply heat to the epoxide resin/curing agent coating compositions, a minimum temperature of about 180° C. being necessary for compositions containing phenols or cresols, and of about 170° C. for compositions containing urea or melamine derivatives. Polycarboxylic acids and their anhydrides have also been used to cure epoxides but, although products with good mechanical properties can be achieved, interest in these compositions has been limited due to the relatively high temperature, e.g. 200° C., necessary for cure.

In order to lower the temperature and/or reduce the time of heating which is necessary to obtain satisfactory coatings, it is customary to include in a coating composition an accelerator for the crosslinking reaction between the epoxide resin and the curing agent. Typical accelerators for the reaction between an epoxide and a polycarboxylic acid or acid anhydride are certain tertiary amines; a particularly favoured material being benzyl dimethylamine (BDMA). However, the use of this particular material, and of many other amines, presents a health hazard in the use of the derived coatings. Thus these amines must be excluded from compositions in which the toxicology of constituent materials is defined and controlled, such as in the lacquer coating of containers for foodstuffs. In addition it is known that many tertiary amines, such as benzyl dimethylamine, which are effective in accelerating the cross-linking of epoxy-acid or -acid anhydride compositions at elevated temperatures also promote cross-linking at room temperature, resulting in premature gelation. Therefore the pot-life of these compositions can be unacceptably short.

We have now found that certain nitrogen-containing materials which do not present a health hazard can be used as accelerators in coating lacquers comprising an epoxide resin and a polycarboxylic acid or acid anhydride which are suitable for use on metal substrates such as tinplate, aluminum, blackplate, sheet iron and steel, coiled steel, hot-dipped galvanised steel and tin-free steel. Certain of these nitrogen-containing materials have been known previously as curing agents for epoxide resins when used alone in a sufficient proportion to effect substantial cross-linking, for example in a molar excess. But it has not been known, and we believe it is surprising, that when used in small quantities together with a chemically dissimilar curing agent these materials can be used to accelerate the reaction between epoxide groups and the curing agent at temperatures significantly lower than can be achieved without an accelerator, or when in the presence of conventional (but toxicologically unacceptable) accelerators such as benzyldimethylamine. We have also found that incorporation of small amounts of these nitrogen-containing materials into epoxy resin-polycarboxylic acid or -acid anhydride compositions results in a significant reduction in the time necessary to effect cure at a fixed temperature. These findings are very significant because of the resultant saving of energy. Moreover, coatings produced from the present lacquers have superior flexibility and resistance to hot water and acids compared with those coatings produced from lacquers containing the conventional accelerators. In addition, compositions according to the present invention show satisfactory pot-life at room temperature.

According to this invention we provide a coating lacquer, which on heating yields a cured non-toxic coating, comprising the components (i) an epoxide resin (ii) a curing agent selected from polycarboxylic acids or polycarboxylic acid anhydrides, (iii) an organic solvent, and (iv) an accelerator for the curing reaction between the epoxide resin and the curing agent, characterised in that the accelerator is selected from materials of chemical structures, or has moieties derived from chemical structures:

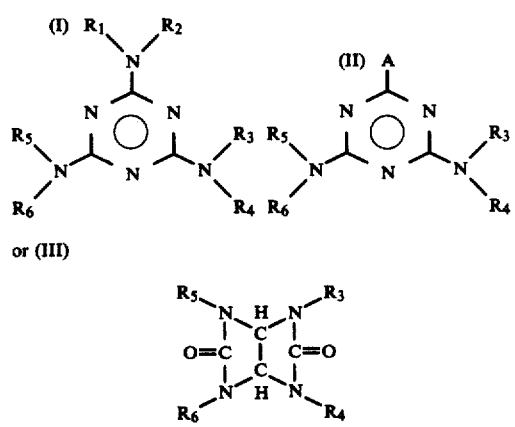

wherein
$R_1$, $R_2$, $R_3$, $R_4$, $R_5$, $R_6$ are H, $C_{1-8}$ alkyl, or substituted $C_{1-8}$ alkyl, the same or different, and A=H, $C_{1-8}$ alkyl, aryl or substituted alkyl/aryl; and further characterised in that there is present not more than 10% by weight of the accelerator based on the total weight of reactant solids.

When $R_1=R_2=R_3=R_4=R=R_6=H$, I is melamine, II is guanamine, and III is glycoluril.

Suitable substituted $C_{1-8}$ alkyl groups include hydroxy alkyl and alkoxy alkyl. The materials containing the latter groups are preferably produced by the condensation of melamine, guanamine, substituted guanamine or glycoluril (the reaction product of glyoxal with urea) with formaldehyde, optionally followed by reaction with an alcohol such as methanol, ethanol, or butanol to produce ether linkages. This process can yield materials which are monomeric, oligomeric or polymeric in structure, but which comprise the structures or a moiety derived from the structures given above, and all of which are suitable for use as the accelerator of this invention.

Preferred accelerators are the alkoxy alkyl melamines, for example hexamethoxymethylmelamine, hexaethoxymethylmelamine and hexabutoxymethylmelamine, and the alkoxy alkyl benzoguanamines, for example the tetramethoxy and tetraethoxy methyl derivatives.

Suitable organic solvents include esters such as 2-ethoxy ethyl acetate and butylacetate; ketone solvents such as methyl ethyl ketone; ether solvents; and aromatic solvents such as xylene. Preferably there is also present an organic liquid ROH wherein R is $C_{1-18}$ alkyl, substituted alkyl or aralkyl. The organic liquid ROH may be caused to react with the polycarboxylic acid anhydride, for example, by heating to a temperature greater than 60° C., as described in our copending patent application of the same date as the present application. Examples of the liquid ROH are butyl glycolate or a monoethyl ether of ethylene glycol. Preferably there is present at least 0.5 equivalents of ROH for each anhydride group (or its equivalent) initially present in the lacquer.

The epoxide resin used in this invention is of broad scope and many such resins are commercially available, for example from Shell and Ciba. In the usual methods of manufacturing epoxide resins, mixtures of compounds of differing molecular weight are obtained, these mixtures ordinarily containing a proportion of compounds whose epoxide groups have undergone partial hydrolysis. The average number of 1, 2-epoxide groups per molecule of the resin need not be an integer of value at least 2; it is generally a fractional number but must in any case be greater than 1.0.

Of the epoxide resins which may be used in the compositions of the present invention, the more suitable are those wherein the epoxide groups are terminal, i.e. of formula

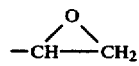

Such resins include, for example, polyglycidyl esters obtainable by the reaction of a substance containing two or more carboxylic acid groups with epichlorohydrin or glycerol dichlorohydrin in the presence of an alkali. Such polyglycidyl esters may be derived from aliphatic carboxylic acids, e.g. oxalic acid, succinic acid, adipic acid, sebacic acid, or dimerised or trimerised linoleic acid, from cycloaliphatic carboxylic acids such as hexahydrophthalic, 4-methylhexahydrophthalic, tetrahydrophthalic and 4-methyltetrahydrophthalic acid, and from aromatic carboxylic acids such as phthalic acid, isophthalic acid and terephthalic acid.

Other epoxide resins which may be used include polyglycidyl ethers, such as those obtainable by the reaction of a substance containing two or more alcoholic hydroxyl groups, or two or more phenolic hydroxyl groups, with epichlorohydrin or glycerol dichlorohydrin under alkaline conditions or, alternatively, in the presence of an acidic catalyst with subsequent treatment with alkali. Such polyglycidyl ethers derived from aliphatic alcohols, for example, ethylene glycol and poly(oxyethylene)glycols such as diethylene glycol and triethylene glycol, propylene glycol and poly(oxypropylene)glycols, propane-1,3-diol, butane-1,4-diol, pentane-1,5-diol, hexane-1,6-diol, hexane-2,4,6-triol, glycerol, 1,1,1-trimethylolpropane and pentaerythritol; from cycloaliphatic alcohols, such as quinitol, 1,1-bis(hydroxymethyl)cyclohex-3-ene, bis(4-hydroxycyclohexyl)methane and 2,2-bis(4-hydroxycyclohexyl)propane; and from alcohols containing aromatic nuclei, such as N,N-bis(2-hydroxyethyl)aniline and 4,4'-bis(2-hydroxyethylamino)diphenylmethane.

Preferably the polyglycidyl ethers are derived from a substance containing two or more phenolic hydroxyl groups, for example, resorcinol, catechol, hydroquinone, bis(4-hydroxyphenyl)methane, 1,1,2,2-tetrakis(4-hydroxyphenyl)-ethane, 4,4'-dihydroxydiphenyl, bis(4-hydroxyphenyl)-sulphone, and, especially phenol-formaldehyde or cresolformaldehyde novolac resins, 2,2-bis(4-hydroxyphenyl)propane (otherwise known as bisphenol A) or 2,2-bis(3,5-dibromo-4-hydroxyphenyl)-propane.

There may further be employed poly(N-glycidyl) compounds, such as are, for example, obtained by the dihydrohalogenation of the reaction products of epichlorohydrin and amines containing at least two hydrogen atoms directly attached to nitrogen, such as aniline, n-butylamine, bis(4-aminophenyl)methane, bis(4-aminophenyl)sulphone, or bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives or hydantoins such as 5,5-dimethylhydantoin.

Preferred epoxide resins are those obtained by the reaction of 2,2-bis(4-hydroxyphenyl)propane (Bisphenol A) with epichlorohydrin in the presence of alkali and having an epoxide equivalent weight of 180–4000.

Typical polycarboxylic acid curing agents are phthalic acid, 1,2,3,6-tetrahydrophthalic acid, hexahydrophthalic acid, isophthalic acid, terephthalic acid, adipic acid, succinic acid, dodecenylsuccinic acid, maleic acid, citric acid, mellitic acid and pyromellitic acid. The polycarboxylic acid is suitably a polyester containing carboxyl groups which is obtained by esterification of a polyoxyalkylene polyol such as a polyoxyethylene glycol, a polyoxypropylene glycol, or a polyoxypropylene triol.

Typical polycarboxylic acid anhydride curing agents are phthalic anhydride, tetrahydrophthalic anhydride, hexahydrophthalic anhydride, succinic anhydride, 3,4,5,6,7,7-hexachloro-3,6-endomethylene, 1,2-tetrahydrophthalic anhydride (chlorendic anhydride), dodecenyl succinic anhydride, 3,6-endomethylene tetrahydrophthalic anhydride, methyl 3,6-endomethylene tetrahydrophthalic anhydride, trimellitic anhydride, polyazelaic anhydride, pyromellitic dianhydride, benzophenone 3,4,3',4'tetracarboxylic dianhydride, 1,2,3,4-butanetetracarboxylic dianhydride, partial esters of glycol or glycerol with trimellitic anhydride, and mixtures thereof.

Preferred curing agents are the carboxyl group-containing esters of glycols with trimellitic anhydride such as ethylene glycol di(anhydro-trimellitate).

The relative proportions of epoxide resin, curing agent and accelerator will depend upon such variables as the reactivity of the reactants and the reaction conditions required. However the proportion of accelerator used is only such as is necessary to accelerate the epoxide-curing agent reaction. Preferably there is used at least 0.001% and not more than 10%, preferably not more than 5%, and more preferably there is used in the range 0.05-2.5% by weight based on the total weight of the reactant solids.

The relative proportions of the curing agent and epoxide are conventional for example within the equivalent ratio range of polycarboxylic acid or acid anhydride:epoxide resin 0.6–1.2:1.

The compositions of the invention may contain additives such as are known in the art for example volatile solvents, non-volatile solvents, pigments, fillers, other resins, stabilisers, slip agents, flow promoters, dyes and plasticisers. Solid epoxide resins may be melted before the curing agent, accelerator, and any other desired materials are added to it.

The present compositions are cured by heating the ingredients at temperatures above room temperature. Excellent rates of cure, resulting in high quality products, are obtained at temperatures in the range 100°–300° C. Preferred temperatures are in the range 120°–270° C.

We have found that the present compositions may be utilised for a wide variety of applications to metals, for example as spray coatings or roller coatings and that they are particularly useful in the coating of cans which are to contain foodstuffs and beverages. Coatings of the latter type must demonstrate exceptional mechanical properties and must be particularly resistant to chemical attack.

The invention is illustrated by the following Examples in which, unless otherwise specified, parts are by weight.

EXAMPLE 1

This Example illustrates the advantage of an accelerator according to the invention, as compared with a conventional benzyl dimethylamine accelerator, when it is used in combination with an epoxy resin and with an acid anhydride as curing agent to form a lacquer suitable for a can coating. The accelerator according to the invention provides significant improvements in the resistance of the coating to flexing and to the effects of hot water or steam. Formulations suitable for producing a coating on tinplate by spraying were prepared according to the following table:

TABLE 1

| Formulation Reference | Epoxy resin solution 'S' parts by wt. in solvent X | | Anhydride solution 'A'. parts by weight. | Accelerator (parts) | | Additional solvent (parts) X |
|---|---|---|---|---|---|---|
| | 50% | 60% | | HBMM | BDMA | |
| (a) | 85.5 | — | 14.5 | — | — | — |
| (b) | 85.5 | — | 14.5 | 0.5 | — | — |
| (c) | 85.5 | — | 14.5 | — | 0.35 | — |
| (d) | — | 67.8 | 17.0 | — | — | 15.2 |
| (e) | — | 67.8 | 17.0 | 0.5 | — | 15.2 |
| (f) | — | 67.8 | 17.0 | — | 0.35 | 15.2 |

Epoxy resin solution 'S' consists of a 2:1 by weight mixture of bisphenol-A based epoxy resins 'G' and 'F,' with epoxide equivalent weights 900 and 1850 respectively dissolved in solvent 'X,' a 1:1 mixture of 2-ethoxyethyl acetate and ¢Solvesso 100."

Anhydride Solution 'A' is a 40% by weight ethylene glycol di(anhydrotrimellitate), solution in a 1:1 cold mixture of 2-methoxyethyl acetate and butyl glycolate. The accelerator used was a commercially available hexabutoxymethylmelamine. (HBMM) Formulations (a), (b) and (c) were spread on tinplate using a wire-wound bar and cured for 2 minutes in an oven at 225° C. to produce a 35μ thick dry film. Formulations (d), (e) and (f) were spread on tinplate panels and cured for 2 minutes in an oven at 200° C. The coated panels were subjected to an impact test which rated the flexibility of the coating and its resistance to a hot water test (see below). The following results were obtained:

TABLE 2

| Formulation reference | Impact Test | Hot Water Test |
|---|---|---|
| Cure 2 minutes at 225° C. 35μ thickness dry films. | | |
| (a) | fail | fail |
| (b) | pass | pass |
| (c) | borderline pass | fail |
| Cure 2 minutes at 200° C., 35μ thickness dry films. | | |
| (d) | fail | fail |
| (e) | pass | pass |
| (f) | pass | fail |

The impact test was carried out using a "Schlagfalt-Prüfgerät," type 471 (Erichsen GmbH, West Germany) according to the recommended procedure. A coated tinplate panel 50×140 mm is bent along its length, coating to the outside, over a metal bar, to form a cylindrical seam 5 mm in diameter. This folded panel is then placed upon a specially shaped anvil, and a weight of 2300 g is allowed to drop onto the panel from a height of 650 mm. The impact causes the panel to be bent into a conical seam, resulting in possible damage to the coating along the seam. In this test the coating was deemed to have failed if it was broken along a length of seam greater than 25 mm, measured from the peak of the cone. The hot water test was carried out as follows:

Coated tinplate panels were sealed in boiling water, under a pressure of 1 bar, for 30 minutes. After drying and cooling, the panels were subjected to a cross-cut adhesion test (DIN 53151) and were asesssed visually for uptake of water.

EXAMPLE 2

This Example illustrates the advantage of an accelerator according to the invention in enabling the curing of a coating for tinplate at a temperature which is significantly lower than that temperature used for conventional tinplate coatings, yet which provides a coating for the interior of cans which is of high resistance to can fillings of a corrosive nature.

Formulations were prepared according to the following table:

TABLE 3

| Formulation Reference | Epoxy resin solution 'S' (parts by weight) | Anhydride solution 'A' (parts by weight) | Hexabutoxy-methylmel-amine. (parts by weight). | Solvent X |
|---|---|---|---|---|
| (a) | 200 | 50 | — | 35 |
| (b) | 200 | 50 | 5.0 | 35 |
| (c) | 200 | — | 20.0 | — |

('S', 'A' and 'X' are as in Example 1)

These formulations were each applied by roller coating to tinplate panels and cured for 12 minutes at temperatures in the range 120°–200° C. to give a final coating of thickness 5μ. A commercially used epoxy-phenolic lacquer, 'EP,' was also applied to tinplate under the same conditions.

The coated panels were subjected to the impact and hot water-resistance tests described above with the following results:

TABLE 4

| Formulation Reference. | Impact Test | | | | | Hot Water Test | | | | |
|---|---|---|---|---|---|---|---|---|---|---|
| °C. | 120 | 140 | 160 | 180 | 200 | 120 | 140 | 160 | 180 | 200 |
| (a) | F | F | F | P | P | F | F | F | P | P |
| (b) | F | P | P | P | P | P | P | P | P | P |
| (c) | F | F | F | F | F | F | F | F | F | F |
| EP | F | F | F | P | P | F | F | P | P | P |

(P = pass, F = fail)

Thus fully satisfactory coatings according to the invention were obtained by curing at 140° C. for 12 minutes whereas a comparable commercial coating was only fully satisfactory when cured at 180° C. for 12 minutes.

EXAMPLE 3

This Example shows the accelerating effect of four materials according to the invention on the curing reaction between methyl, 3,6-endomethylene tetrahydrophthalic anhydride (MNA) and a bisphenol-A based epoxy resin, 'E,' of epoxide equivalent weight 500.

Blend 1 was prepared as follows:

| | |
|---|---|
| MNA | 18.4 g |
| Epoxide Resin 'E' | 49.0 g |
| Solvent 'X' | 52.7 g |

Experimental formulations were prepared by addition of 2.4 g of the appropriate accelerator to 100 g Blend 1.

TABLE 5

| Accelerator | Description of commercially available products: |
|---|---|
| Additive 1 | Hexabutoxymethylmelamine |
| Additive 2 | Hexamethoxymethylmelamine |
| Additive 3 | Substituted benzoguanamine |
| Additive 4 | Substituted glycoluril |

200μ wet films were spread on tinplate using a wire-wound bar and heated for different periods of time in an oven at 140° C. Panels were removed from the oven, cooled to room temperature, and tested immediately for cure by a "thumb-twist" method. The cure time required to produce a film unaffected by a "thumb-twist" was noted.

TABLE 6

| Additive | Cure time (minutes) |
|---|---|
| none | 13 |
| 1 | 7 |
| 2 | 7 |
| 3 | 11 |
| 4 | 12 |

EXAMPLE 4

This Example shows the accelerating effect of the materials used in Example 3 on the curing reaction between ethylene glycol di(anhydro-trimellitate) and a bisphenol-A based epoxy resin, 'F,' of epoxide equivalent weight 1850.

Blend 2 was prepared as follows:

| | |
|---|---|
| anhydride solution A | 60 g |
| epoxy resin 'F' | 144 g |
| solvent 'X' | 144 g |

Experimental formulations were prepared by addition of 2.0 g of the appropriate accelerator (Table 5) to 100 g Blend 2.

100μ (wet) films were spread on tinplate using a wire-wound bar, and heated for different periods of time in an oven at 160° C. The cure time required to produce a film which passes the impact test described in Example 1 was noted.

TABLE 7

| Additive | Cure Time (minutes) |
|---|---|
| none | 20 |
| 1 | 6 |
| 2 | 4 |
| 3 | 7 |
| 4 | 13 |

EXAMPLE 5

This Example shows the advantage of the present invention over the use of a conventional amine catalyst such as benzyldimethylamine (BDMA), in that a much longer pot-life is obtained.

The following samples were prepared:

TABLE 8

| Formulation Reference | Epoxy Resin 'H' (parts by weight) | MNA (see Ex. 3) (parts) | Additive 1 (parts) | BDMA (parts) |
|---|---|---|---|---|
| (a) | 53 | 47 | 2.0 | none |
| (b) | 53 | 47 | none | 0.5 |

Epoxy resin 'H' is a bisphenol-A based epoxy resin, of epoxide equivalent weight 190.

The samples, initially fluid, were stored at 20° C. and examined at 7-day intervals.

It was found that (b) was completely solid after 7 days and not suitable for use. (a) was still fluid and suitable for use after 28 days.

We claim:

1. A coating lacquer, which on heating (and with savings in energy) yields a non-toxic cured coating on a metal substrate, comprising the components:
   (i) an epoxide resin
   (ii) a curing agent selected from polycarboxylic acids or polycarboxylic acid anhydrides
   (iii) an organic solvent, and
   (iv) an accelerator for the curing reaction between the epoxide resin and the curing agent characterised in that the accelerator is selected from materials of chemical structures, or has moieties derived from chemical structures:

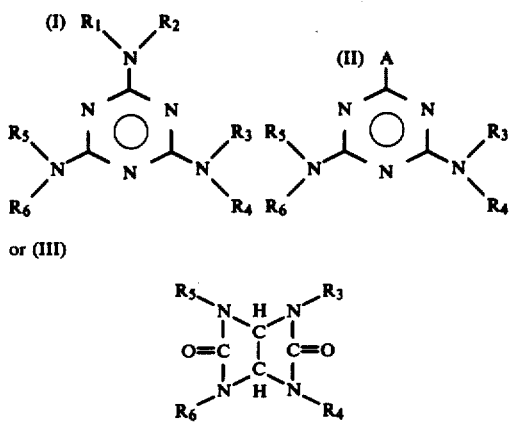

wherein $R_1$, $R_2$, $R_3$, $R_4$, $R_5$, $R_6$ are H, $C_{1-8}$ alkyl or substituted alkyl, the same or different, and A = H, $C_{1-8}$ alkyl, aryl or substituted alkyl/aryl; and further characterised in that there is present not more than 10% by weight of the accelerator based on the total weight of reactant solids.

2. A coating lacquer according to claim 1 wherein the accelerator is selected from the group alkoxy alkyl melamines and alkoxy alkyl benzoguanamines.

3. A coating lacquer according to claim 1 wherein the accelerator is selected from the group hexamethoxymethylmelamine, hexaethoxymethylmelamine, hexabutoxymethylmelamine, tetramethoxymethylbenzoguanamine and tetraethoxymethylbenzoguanamine.

4. A coating lacquer according to claim 1 wherein there is present 0.001–5% by weight of the accelerator based on the weight of the reactant solids.

5. A coating lacquer according to claim 1 wherein there is also present an organic liquid ROH wherein R is $C_{1-18}$ alkyl, substituted alkyl or aralkyl.

6. A coating lacquer according to claim 5, wherein the organic liquid ROH is an alkanol, an ether alkanol or a hydroxy ester.

* * * * *